United States Patent [19]
Brooks

[11] Patent Number: 5,249,721
[45] Date of Patent: Oct. 5, 1993

[54] INTERFRAME ARTICLE CARRIER

[76] Inventor: William P. Brooks, 450 Adams, SE., Grand Rapids, Mich. 49507

[21] Appl. No.: 807,031

[22] Filed: Dec. 12, 1991

[51] Int. Cl.⁵ ............................................. B62J 7/00
[52] U.S. Cl. ................... 224/35; 224/30 R; 224/31; 224/32 R; 280/202
[58] Field of Search ............... 224/30 R, 32 R, 35, 224/31; 280/202

[56] References Cited

U.S. PATENT DOCUMENTS

| | | | |
|---|---|---|---|
| 444,642 | 1/1891 | Allen, Jr. et al. | 224/35 |
| 522,186 | 7/1894 | Andrews | 224/35 |
| 567,162 | 9/1896 | Peirce | 224/35 X |
| 618,612 | 1/1899 | Parsons | 224/35 |
| 4,193,525 | 3/1980 | Sommers . | |
| 4,262,829 | 4/1981 | Hine, Jr. et al. . | |
| 4,368,897 | 1/1983 | Brown | 224/32 R X |
| 4,720,027 | 1/1988 | Board | 224/35 |
| 4,852,778 | 8/1989 | Beiser et al. | 224/30 |
| 4,955,516 | 9/1990 | Satterfield . | |
| 5,031,807 | 7/1991 | Tiffany | 224/35 |
| 5,071,046 | 12/1991 | Miller | 224/35 X |

FOREIGN PATENT DOCUMENTS

| | | | |
|---|---|---|---|
| 470105 | 12/1950 | Canada | 224/32 R |
| 3224067 | 12/1983 | Fed. Rep. of Germany | 224/30 |
| 875119 | 9/1942 | France | 224/30 |
| 20217 | 8/1915 | United Kingdom | 224/35 |

Primary Examiner—Allan N. Shoap
Assistant Examiner—Stephen K. Cronin
Attorney, Agent, or Firm—Price, Heneveld, Cooper, DeWitt & Litton

[57] ABSTRACT

An article carrier for a bicycle conforms to the shape of a bicycle and has substantially the same dimensions as the bicycle frame. The article carrier includes a waterproof base and cover which are removably assembled to protect items carried within the article carrier.

15 Claims, 3 Drawing Sheets

INTERFRAME ARTICLE CARRIER

BACKGROUND OF THE INVENTION

The invention pertains to article carriers, and more particularly to an interframe article carrier for bicycles.

A wide variety of article carriers, or packs, are known for use with bicycles. Handlebar packs are adapted to be mounted to the handlebars of a bicycle. Packs are also known for mounting to the seat of a bicycle. Small interframe packs are also known which are mounted to the bicycle frame. Such interframe packs are mounted in an upper corner of the frame below the seat or in the upper corner of the frame below the handlebar. For touring purposes, larger packs are well known which mount to a bicycle carrier supported over the front or rear wheels. The front and rear packs are mounted such that they are supported on both sides of the front and rear wheels.

Although known article carriers provide a wide variety of methods for storing articles for transport on a bicycle, known article carriers have several disadvantages. Handlebar packs, seat packs, and known interframe packs are small in size. Larger packs attached to bicycle carriers mounted above the front and rear wheels change the weight distribution on the bicycle. This substantially alters the center of gravity of a bicycle. For lightweight bicycles, the packs may significantly alter the weight distribution on the bicycle, possibly having an adverse effect on the bicycle rider's balance and making the bicycle difficult to steer. Furthermore, article carriers may not adequately protect items carried therein from dirt and water.

An additional difficulty with known article carriers is mounting them to the bicycle. Packs mounted to bicycle carriers extending over the front and rear wheels require that a bicycle carrier be assembled to the bicycle. Once the bicycle carrier is mounted on the bicycle, the pack is assembled to the bicycle carrier. Handlebar packs, seat packs and packs mounted to bicycle carriers are typically mounted on the bicycle using a mounting bracket. Mounting the article carrier thus requires the use of tools. If mounting brackets are not used to attach handlebar packs and seat packs, the packs will swing freely on the bicycle. Such movement may interfere with the rider's operation of the bicycle. Additionally, the swinging of the packs may cause damage to delicate articles carried within the packs.

SUMMARY OF THE INVENTION

The present invention represents an improvement over the prior art by providing an article carrier which is easy to assemble on a bicycle and does not significantly alter the center of gravity of the bicycle. In one aspect of the invention, an article carrier is disclosed which conforms substantially to the shape of a bicycle frame. In another aspect of the invention, the article carrier is substantially the same size as the bicycle frame.

The article carrier provides an apparatus for transporting items such that they are protected from water and dirt and are easily accessible. The article carrier has a low center of gravity and does not interfere with bicycle steering. The article carrier attaches to the bicycle without using brackets and without the use of tools.

These and other objects, aspects and features of the invention will be more fully understood and appreciated by reference to the written specification and appended drawings.

DESCRIPTION OF THE PREFERRED EMBODIMENTS

Figure 1:
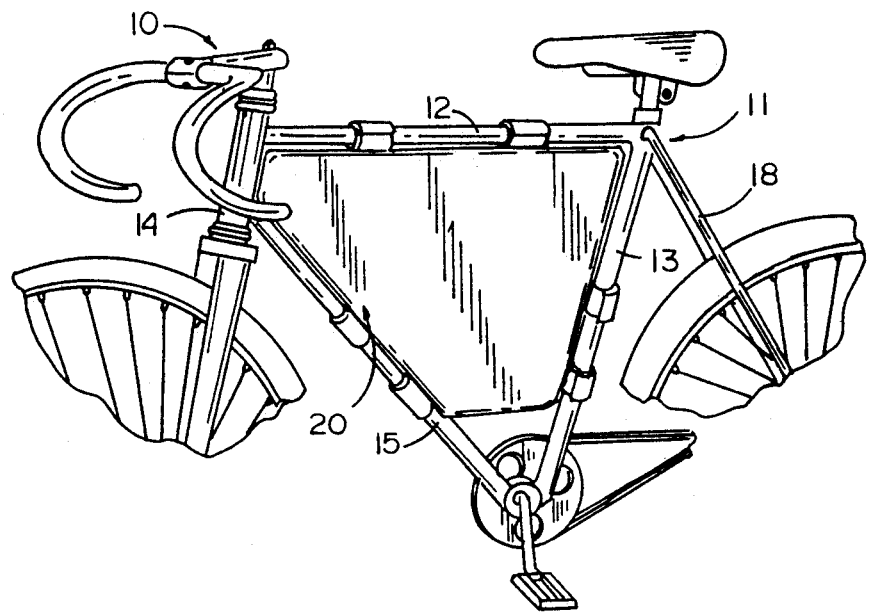
FIG. 1 is a fragmentary perspective view of a bicycle including an article carrier according to the invention.
Figure 2:
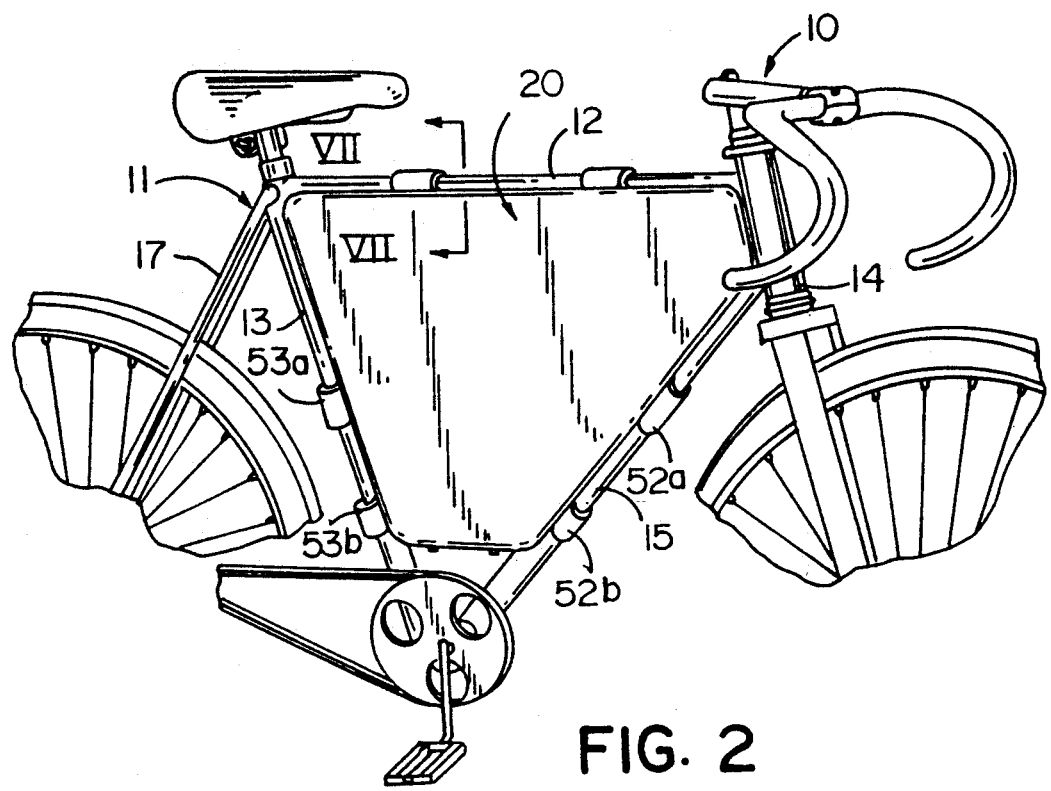
FIG. 2 is a fragmentary perspective view of the bicycle including an article carrier according to the invention taken from the opposite side of FIG. 1.
Figure 5:
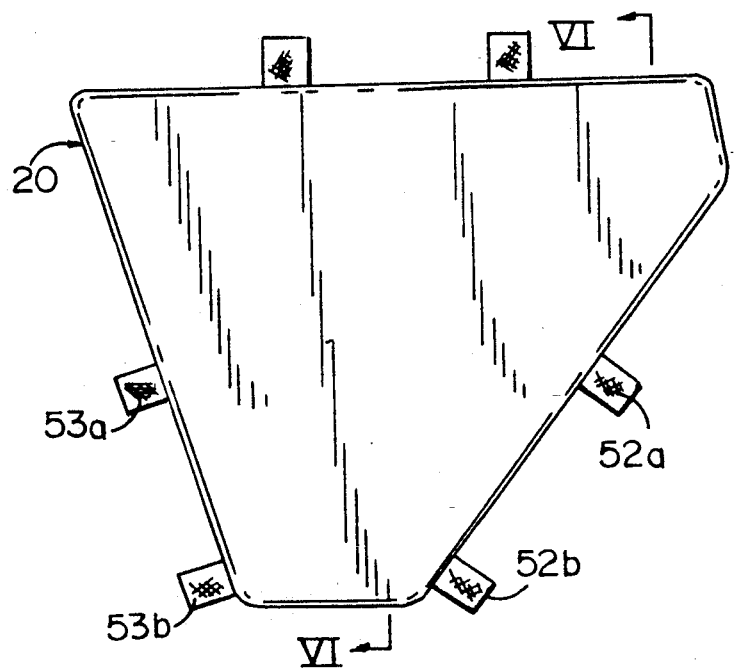
FIG. 5 is a top view of a closed article carrier of FIG. 1.

With reference to FIGS. 1 and 2, and the illustrated embodiment depicted therein, a bicycle 10 includes a tubular frame 11. The frame includes a generally horizontal tube 12. Attached to the rearward end of horizontal tube 12 is a generally vertical seat tube 13. The forward end of horizontal tube 12 joins a generally Vertical fork tube 14. The bottom of generally vertical seat tube 13 and generally vertical fork tube 14 are joined by a downwardly and rearwardly projecting lower tube 15. A pair of rearwardly and downwardly projecting rear wheel tubes 17 and 18 are mounted to tube 13. Those skilled in the art will recognize that the actual shape of the bicycle frame will depend upon the manufacture of the frame. Thus, frame 11 in FIG. 1 is merely for illustrative purposes. An article carrier 20 is supported within the bicycle frame. The article carrier is substantially the same size as the interior of frame 11 and conforms to the shape of tubes 12-15 in frame 11. The article carrier thus uses a maximum amount of the space available within the frame.

Figure 3:
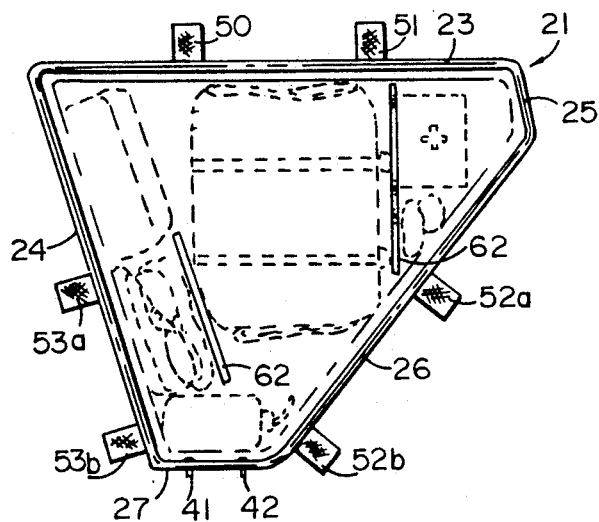
FIG. 3 is a top view of an open article carrier base according to FIG. 1.
Figure 4:
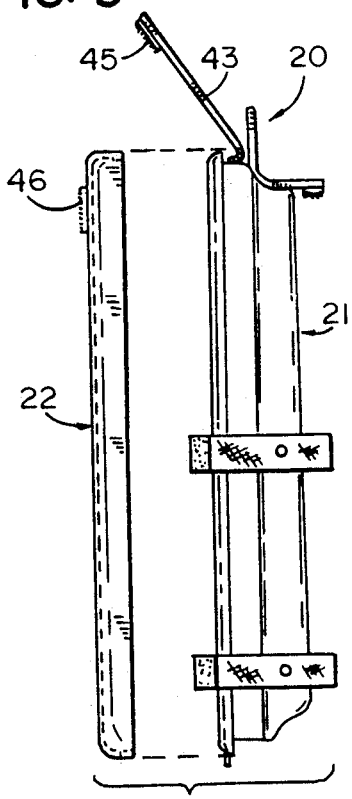
FIG. 4 is a side view of the cover and bottom of the article carrier separated from one another.

Article carrier 20 includes a base 21 (FIG. 3) and a cover 22 (FIG. 4). The base includes a top wall 23, a rear forwardly and downwardly projecting wall 24, a front forwardly and downwardly projecting wall 25, a lower rearwardly and downwardly projecting wall 26, and a bottom wall 27. Walls 23-27 extend substantially orthogonally to, and outwardly from, a back wall 28. Cover 22 is assembled to Walls 23-27 and encloses article carrier 20 to protect items carried therein from water and dirt. Article carrier 20 is configured to fit within frame 11 of bicycle 10. When the article carrier is assembled to the bicycle frame, top wall 23 extends parallel to horizontal tube 12; wall 24 extends parallel to substantially vertical seat tube 13; sidewall 25 extends parallel with substantially vertical, fork tube 14; wall 26 extends parallel to tube 15; and bottom wall 27 extends substantially parallel to top wall 23 above the apex of pedals 32 and 33 when they rotate on bicycle 10.

Figure 6:
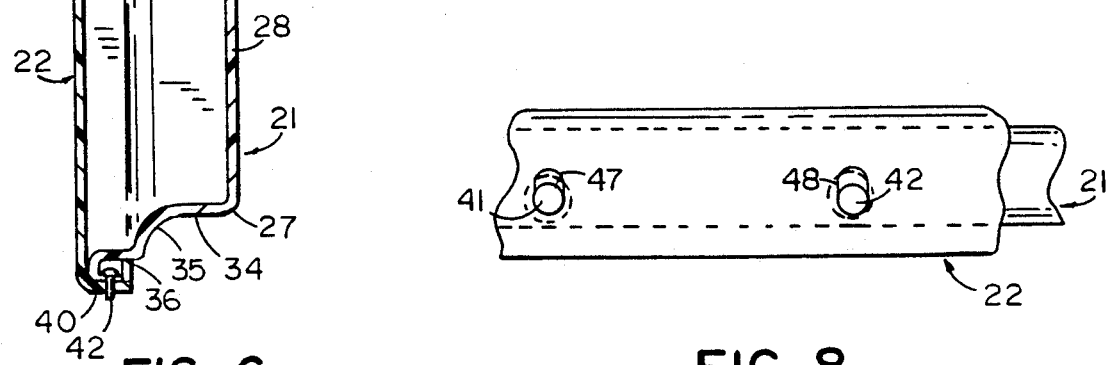
FIG. 6 is a cross-sectional view of the cover and base taken along plane VI—VI in FIG. 5.

Somewhat more specifically, walls 23-27 and back 28 of base 21 are integrally molded. The article carrier, according to a preferred embodiment of the invention, is molded from a substantially rigid organic polymer. Each wall 23-27 includes four sections. An inner planar section 34 (FIG. 6) is integral with and extends outwardly from back 28. An outer planar section 36 is spaced from and substantially parallel to the inner planar section 34. A curved section 35 extends between inner section 34 and outer section 36. A generally C-shaped lip 37 extends from outer section 36.

Figure 7:
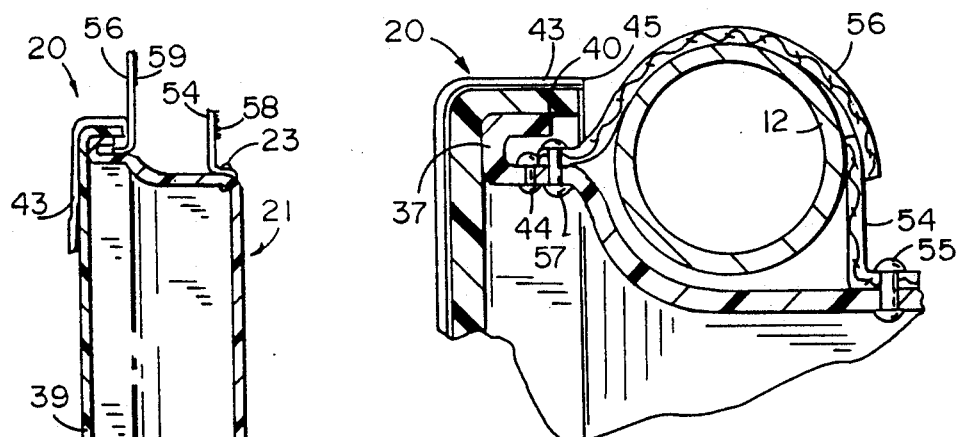
FIG. 7 is a cross-sectional view taken along the plane VII—VII in FIG. 2.

Cover 22 includes a planar panel 39 (FIGS. 6 and 7) having a shape conforming to the shape of base 21 of article carrier 20. Cover 22 includes a lip 40 which extends outwardly from panel 39 around the entire periphery of panel 39. Lip 40 is adapted to abut with the generally C-shaped lip 37 of base 21. In the preferred embodiment of the invention, lip 40 and panel 39 are integrally molded of a substantially rigid organic polymer.

Figure 8:
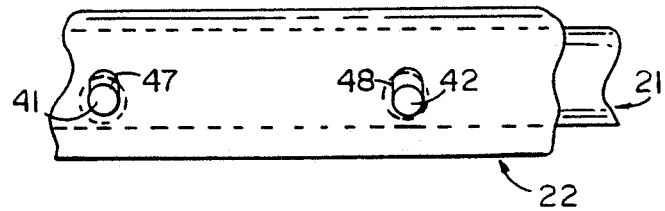
FIG. 8 is a fragmentary bottom view of the article carrier of FIG. 1.

Cover 22 is removably assembled to base 21 in a preferred embodiment of the invention. In the most preferred embodiment of the invention, base 21 includes two rivets 41 and 42 (FIGS. 3 and 8). A strap 43 is connected to base 21 using a rivet 44. A hook member 45 of a hook-and-loop fastener such as that sold under the trademark Velcro (FIG. 4) is mounted on strap 43 on an end thereof. The hook member may be attached using an adhesive or by sewing. Cover 22 includes a loop member 46 of the fastener and two apertures 47 and 48 on lip 40 (FIG. 8). The loop member may be attached using an adhesive. Rivets 41 and 42 are assembled to the generally C-shaped lip 37, such that they project outwardly from bottom wall 27. Strap 43 is attached to top wall 23 using a rivet 44. Apertures 47 and 48 are formed in lip 40 where it abuts with rivets 41 and 42 of wall 23. The hook-and-loop members may, of course, be reversed.

To assemble article carrier 20 to bicycle 10, base 21 includes attachment members 50-53 (FIG. 3) on the perimeter thereof. Top wall 23 has two attachment members 50 and 51 assembled thereto. Wall 24 includes an attachment member 52a, 52b assembled thereto. Wall 26 includes an attachment member 53a, 53b assembled thereto. Each attachment member includes a strap 54 (FIGS. 6 and 7) assembled to inner section 34 of a respective wall using rivet 55. Each attachment member also includes a strap 56 assembled to outer section 36 using rivet 57. In a preferred embodiment of the invention, strap 54 includes a hook member 58 and strap member 56 includes a loop member 59. Members 58 and 59 are preferably affixed to strap 54 and strap 56 using an adhesive or by sewing the member to the respective strap.

To attach cover 22 to base 21, rivets 41 and 42 are received in apertures 47 and 48 of cover 22. Member 45 on strap 43 is then attached to member 46. Lip 40 forms a seal with generally C-shaped lip 37 to prevent water and dirt from entering into the interior of article carrier 20. Lip 37 pushes water back from the cover. To open cover 22 of article carrier 20, members 45 and 46 are separated and strap 43 is pulled open. Cover 22 is then removed from rivets 41 and 42.

Figure 10:
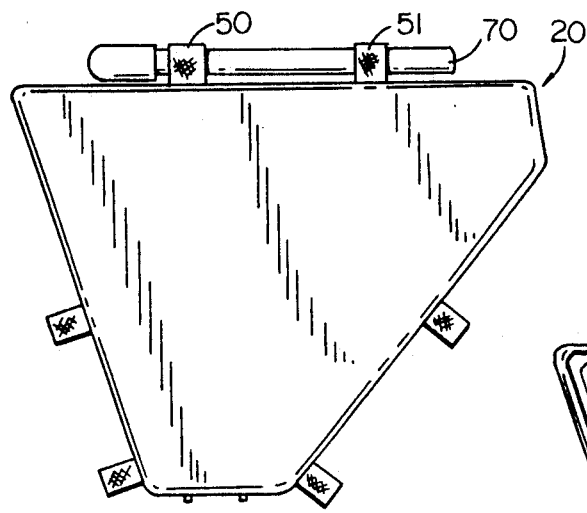
FIG. 10 is a top view of an article carrier with a pump attached thereto.
Figure 9:
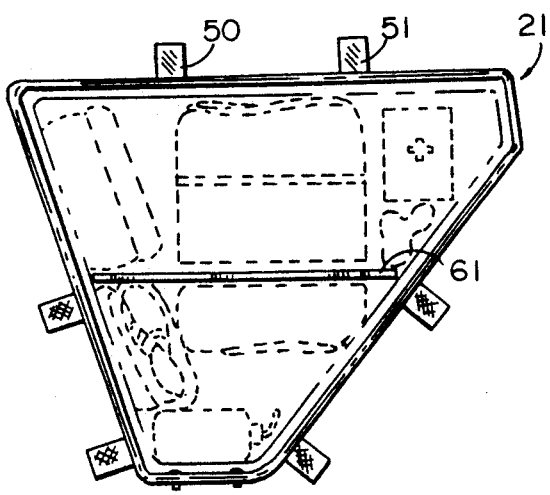
FIG. 9 is a top view of an open article carrier base showing an alternate embodiment of the invention.

To assemble article carrier 20 to bicycle frame 11, the inner panel is inserted through the inner opening of frame 11. The rounded section 35 around the outer perimeter of the base abuts with frame 11. The two straps 54 and 56 of each of the attachment members 50-53 are wrapped around frame 11 and members 58 and 59 are connected. When the four attachment members 51-53b are assembled to the bicycle frame, the article carrier is securely affixed to the bicycle frame. As illustrated in FIG. 10, straps 50 and 51 may also be used to secure a bicycle pump 70 to the article carrier. The pump serves as a handle for the article carrier when it is removed from the bicycle.

The article carrier can be attached to the bicycle frame before or after it is loaded. In one embodiment of the invention, one or more generally horizontal shelves 61 are supported on the interior of article carrier base 21 using an adhesive, a slotted bracket (not shown) attached to the article carrier using a rivet, or the like. The shelves allow stacking of items within the article carrier to assist in loading the base. Shelves are particularly advantageous if the article carrier is to be loaded while it is assembled to the bicycle. Alternatively, spacers 62 (FIG. 3) may be inserted into the article carrier between items carried therein. Such spacers assist in holding articles in the article carrier when it is loaded and unloaded while the article carrier base is attached to the bicycle.

Thus, it can be seen that an article carrier is disclosed which makes maximum use of the area within frame tubes 12-15. Because the article carrier conforms to the shape of the bicycle frame, and is substantially the same size thereof, the article carrier fits snugly within the bicycle frame and does not move therein. Additionally, the article carrier provides a substantially rigid, watertight compartment for storage of items therein. Finally, the article carrier is supported within the frame and does not detrimentally affect a bicycle rider's balance or ability to steer the bicycle. In the preferred embodiment of the invention, the article carrier is approximately four inches in width such that the article carrier does not interfere with pedaling the bicycle.

It is to be understood that the above is merely a preferred embodiment of the invention and that various changes and alterations can be made without departing from the spirit or scope of the invention, as defined by the appended claims.

The embodiments of the invention in which an exclusive property or privilege is claimed are defined as follows:

1. An article carrier for a bicycle having a frame including a generally horizontal cross tube, a generally vertical seat tube, a generally vertical fork tube and a diagonal tube extending between the fork tube and the seat tube, said article carrier including:

a base, said base including wall extending form a back and defining a perimeter of said base, said perimeter of said base conforming to the shape of the frame, at lest one of said walls including another wall section and an inner wall section, said outer and inner wall sections joined by an integral intermediate section, wherein the inner wall section from a smaller peripheral dimension than the outer wall section, whereby the portion of said base defined by the inner wall section is received in the frame and said intermediate section abuts with the frame when said base is mounted on the bicycle to positively position said base on the frame; and a cover, said cover having substantially the same shape as said base, said cover enclosing the interior of said base when said cover is assembled to said base.

2. The article carrier as defined in claim 1, wherein said base back and walls are integrally molded.

3. The article carrier as defined in claim 1, wherein said article carrier is substantially rigid.

4. The article carrier as defined in claim 1, wherein said base and cover are formed of a material which is waterproof.

5. The article carrier as defined in claim 1, wherein said article a carrier includes straps on said walls, said straps including attachment members whereby said straps are used to secure said base on the bicycle frame.

6. The article carrier as defined in claim 5, wherein said attachment members include hook-and-loop members, said hook-and-loop member utilized to affix said base on the bicycle frame.

7. An article carrier for a bicycle having a frame including a generally horizontal cross tube, a generally vertical seat tube, a generally vertical fork tube and a diagonal tube extending between the fork tube and the seat tube, said article carrier including:
- a base, said base including walls extending from a back and defining a perimeter of said base, said perimeter of said base conforming to the shape of the frame; and
- a cover, said cover having substantially the same shape as said base, said cover enclosing the interior of said base when said cover is assembled to said base, wherein one of said base and said cover includes at least one rivet and the other of said base and said cover includes at least one aperture adapted to receive said at least one rivet, said article carrier further including releasable attachment means on said base and said cover, whereby said at least one rivet, said at least one aperture and said releasable attachment means are used to removably support said cover on said base.

8. The article carrier as defined in claim 7, wherein said releasable attachment means include a strap carried on said base and a strap carried on said cover, each of said straps including a means for engaging whereby said straps are interconnected by said means for engaging to support said cover on said base.

9. An article carrier for a bicycle including a frame comprising:
- a base, said base including a back and walls extending outwardly from said back, said walls defining an outer perimeter of said base, said outer perimeter having a larger perimeter section and a smaller perimeter section joined by an intermediate section, and said walls having substantially the same shape as the bicycle frame, said smaller perimeter section of said base adapted to fit within the frame and said outer perimeter section being larger than the frame whereby said intermediate section is adapted to abut with the frame to positively position said base in the frame when said base is mounted on the frame; and
- a cover adapted to be assembled to said base, said cover being substantially the same size and shape as said base.

10. The article carrier as defined in claim 9, wherein said base, back and sidewalls are integrally molded.

11. The article carrier as defined in claim 9, wherein said article carrier is substantially rigid.

12. The article carrier as defined in claim 9, wherein said base and cover are formed of a material which is waterproof.

13. The article carrier as defined in claim 9, wherein said article carrier includes straps on at least one of said inner and outer perimeter walls, said straps including attachment members, whereby said straps are used for securing said base on the bicycle frame.

14. An article carrier for a bicycle including a frame comprising:
- a base, said base including a back and walls extending outwardly from said back, said walls defining a perimeter of said base, and said walls having substantially the same size and shape as the bicycle frame; and
- a cover adapted to be assembled to said base, said cover being substantially the same size and shape as the frame, wherein one of said base and said cover includes at lest one rivet and the other of said base and said cover includes at least one aperture adapted to receive said at least one rivet, said article carrier further including releasable attachment members on said cover and said base whereby said at least one rivet, said at least one aperture and said releasable attachment member are utilized to removably attach said cover to said base.

15. The article carrier as defined in claim 14, wherein said releasable attachment members include a strap carried on said base and a strap carried on said cover, said straps being interconnected to secure said cover to said base when said at least one rivet is received in said at least one aperture.

* * * * *

UNITED STATES PATENT AND TRADEMARK OFFICE
CERTIFICATE OF CORRECTION

PATENT NO.  : 5,249,721
DATED       : October 5, 1993
INVENTOR(S) : William P. Brooks It is certified that error appears in the above-indentified patent and that said Letters Patent is hereby corrected as shown below:

Column 2, line 35;
   "Vertical" should be --vertical--.

Column 2, line 56;
   "Walls" should be --walls--.

Column 4, line 49, Claim 1;
   "wall" should be --walls--.

Column 4, line 49, Claim 1;
   "form" should be --from--.

Column 4, line 52, Claim 1;
   "lest" should be --least--.

Column 4, line 52, Claim 1;
   "another" should be --an outer--.

Column 4, line 56, Claim 1;
   "from" should be --forms--.

Column 5, line 7, Claim 5;
   After "article" delete --a--.

Column 5, line 12, Claim 6;
   "member" should be --members--.

Column 6, line 33, Claim 14;
   "lest" should be --least--.

UNITED STATES PATENT AND TRADEMARK OFFICE
CERTIFICATE OF CORRECTION

PATENT NO. : 5,249,721
DATED : October 5, 1993
INVENTOR(S) : William P. Brooks

It is certified that error appears in the above-indentified patent and that said Letters Patent is hereby corrected as shown below:

Column 6, line 39, Claim 14;
    "member" should be --members--.

Signed and Sealed this

Twelfth Day of July, 1994

*Attest:*

BRUCE LEHMAN

*Attesting Officer*    *Commissioner of Patents and Trademarks*